United States Patent [19]

Satas

[11] Patent Number: 4,973,360

[45] Date of Patent: Nov. 27, 1990

[54] SEALANT FOR THE COOLING SYSTEM OF AUTOMOTIVE AND OTHER ENGINES

[75] Inventor: Donatas Satas, Warwick, R.I.

[73] Assignee: Miracle Mechanics, Inc., Wilmington, Del.

[21] Appl. No.: 211,047

[22] Filed: Jun. 24, 1988

[51] Int. Cl.$^5$ ................................................ C09K 3/12
[52] U.S. Cl. ........................................ 106/33; 252/72
[58] Field of Search ............................ 106/33; 252/72

[56] References Cited

U.S. PATENT DOCUMENTS

| | | | |
|---|---|---|---|
| 1,853,341 | 4/1932 | Djidich | 252/72 |
| 1,868,195 | 7/1932 | Cumming et al. | 106/33 |
| 2,188,311 | 1/1940 | Reimers | 106/33 |
| 2,241,963 | 5/1941 | Rosenthal | 106/33 |
| 2,264,388 | 12/1941 | Lamprey | 106/33 |
| 2,357,650 | 9/1944 | Hall | 106/33 |
| 2,885,296 | 5/1959 | Welden | 106/33 |
| 3,352,696 | 11/1967 | Wallace | 106/33 |
| 3,947,610 | 3/1976 | Bodmeretak | 106/33 |
| 4,708,195 | 11/1987 | Barks | 106/33 |
| 4,743,393 | 5/1988 | Hirozawa | 252/75 |
| 4,765,629 | 8/1988 | Barks | 252/72 |
| 4,765,630 | 8/1988 | Barks | 252/72 |

*Primary Examiner*—William R. Dixon, Jr.
*Assistant Examiner*—Helene Klemanski
*Attorney, Agent, or Firm*—Connolly & Hutz

[57] ABSTRACT

A sealant for the cooling system of automotive and other engines is in the form of an aqueous solution which flows into the cracks of the engine and then solidifies in situ to seal the cracks. The aqueous solution comprises major and minor additives to water. Numerous possible major ingredients are disclosed.

2 Claims, No Drawings

SEALANT FOR THE COOLING SYSTEM OF AUTOMOTIVE AND OTHER ENGINES

BACKGROUND OF INVENTION

This invention relates to sealing leaks in cooling systems such as in automotive or other engines. Various approaches have been taken in the prior art to treat this problem. One particularly noteworthy approach is described in U.S. Pat. No. 4,708,195 to Robert W. Barks. In that patent an aqueous solution is formed by adding to water a major additive sodium silicate or water glass and minor additives of blue vitroil and gum of arabic.

Another approach is described in application Ser. No. 940,403, filed Dec. 11, 1986, now U.S. Pat. No. 4,765,629. In that application the sealant comprises a liquid carrier with solid particles. The solid particles flow into larger holes or cracks to partially fill the holes or cracks with liquid carrier then solidifying to complete the sealing operation. Application Ser. No. 66,259, filed June 25, 1987, now U.S. Pat. No. 4,765,630, discloses a variation of the approach.

SUMMARY OF INVENTION

An object of this invention is to provide a sealant of the above type in the form of an aqueous solution.

A further object of this invention is to provide such a sealant in which other materials may be used instead of the sodium silicate.

In accordance with this invention a sealant is provided of the type disclosed in U.S. Pat. No. 4,708,195 but wherein the major additive is a material other than sodium silicate. Such material may be other alkali silicates, other compounds having proper solubility properties or other organic or inorganic compounds.

DETAILED DESCRIPTION

This invention is directed to materials which may be incorporated in liquid sealants of the type disclosed in the above patent and applications, the details of which are incorporated herein by reference thereto. In particular, the invention is concerned with other major additives which may be used in place of the sodium silicate of U.S. Pat. No. 4,708,195. In that patent the preferred embodiment comprises mixing one teaspoon of gum arabic and one tablespoon of blue vitroil with one gallon of water to produce an initial aqueous mixture of 0.39% blue vitroil and 0.13% gum of arabic. One gallon of sodium silicate is then mixed with one-third of one pint of the initial aqueous solution. This produces a final mixture of 95.8% sodium silicate, 4.1% water, 0.16% blue vitroil and 0.005% gum of arabic.

The sodium silicate is effective because it gels fast upon losing water and upon cooling. It also has a good adhesion to metals.

Sodium silicate is a general term applied to a group of materials. They are compositions in which sodium oxide is combined with various amounts of silica usually with some water. They differ in $SiO_2/Na_2O$ ratio and in the amount of water attached. Sodium silicates are available in $SiO_2/Na_2O$ from 0.5 to 4. The number of water molecules per one molecule of sodium silicate may vary from 0 to 10.5. Colloidal properties of sodium silicate (important for the sealant product) start appearing at $SiO_2/Na_2O$ ratio of 2 and are quite pronounced at 3.

OTHER ALKALI METAL SILICATES

Silicates where sodium is replaced by other alkali metal are expected to have similar properties. Potassium (K), lithium (Li) and ammonium ($NH_4$) silicates should be usable for such applications. This could be extended to other less common alkali metals: rubidium (Rb), Cesium (Cs). Replacement of sodium with germanium (Ge) have a gel forming compound. Part of sodium oxide could be also replaced with aluminum oxide, calcium oxide, or magnesium oxide.

In addition to the above silicates, there is a large number of solid soluble silicates that can be used. Examples of such commercially available compounds are listed in the following Table:

TABLE 1

| Anhydrous | | Hydrated | |
|---|---|---|---|
| $Li_4SiO_4$ | $Rb_2Si_2O_5$ | $Na_3HSiO_4\,H_2O$ | $Na_6Si_{13}O_{29}11H_2O$ |
| $Li_2SiO_3$ | $Rb_2Si_4O_9$ | $Na_3HSiO_4\,2H_2O$ | |
| $Li_2Si_2O_5$ | | $Na_3HSiO_4\,5H_2O$ | $K_2SiO_3\,0.5H_2O$ |
| | $NaLiSiO_3$ | | $K_2SiO_3H2O$ |
| $Na_4SiO_4$ | $KLiSiO_3$ | $Na_2SiO_3H_2O$ | |
| $Na_6Si_2O_7$ | $K_4Li_2Si_6O_{15}$ | $Na_2SiO_35H_2O$ | $K_2Si_2O_5H_2O$ |
| $Na_2SiO_3$ | $K_{16}Li_4Si_7O_{21}$ | $Na_2SiO_36H_2O$ | |
| $Na_2Si_2O_5$ | $K_{10}Li_2Si_7O_{20}$ | $Na_2SiO_38H_2O$ | $K_2Si_4O_9H_2O$ |
| | $K_5LiSi_2O_7$ | $Na_2SiO_39H_2O$ | |
| $K_2SiO_3$ | | | |
| $K_2Si_2O_5$ | | | |
| $K_2Si_4O_9$ | | | |

Other suitable materials include alkaline salts of salicic acid.

COMPOUNDS OF PROPER SOLUBILITY PROPERTIES

One of the reasons for the performance of sodium silicate is its sharp decrease in solubility as the temperature drops. Other compounds which exhibit similar behavior might also work, although there are many other factors which are required for performance as a sealant. The following inorganic compounds were found to have a sharp decrease in solubility in the temperature interval 100–20° C.:

Aluminum sulfate
Ammonium cobalt (II) sulfate
Ammonium dichromate
Ammonium dihydrogen phosphate
Ammonium hydrogen carbonate
Ammonium magnesium sulfate
Ammonium oxalate
Ammonium zinc sulfate
Barium sulfide
Cadmium formate
Calcium gluconate
Cesium ammonium sulfate
Cesium chlorate
Cesium perchlorate
Mercury (II) chloride
Potassium chlorate
Potassium perchlorate
Sodium tetraborate
Sodium fluorosilicate
Strontium hydroxide
Thallium chlorate Of the above compounds, the following appear to be especially promising: ammonium hydrogen carbonate, calcium gluconate, cesium ammonium sulfate, sodium tetraborate, sodium fluorosilicate, strontium hydroxide, and thallium chlorate.

It is to be understood that effective sealing results from crystallization upon cooling because of different solubilities. Iron powder, for example, has been used as a sealant in automobile radiators, as disclosed in U.S. Pat. No. 2,952,554. The setting appears to occur by corrosion of the iron and crystallization of solids. Sulfur and sulfur containing cements should also be suitable since sulfur melts at 110° C. and will precipitate when the temperature decreases.

OTHER INORGANIC COMPOUNDS

The following inorganic compounds appear to be suitable as a replacement for sodium silicate:
Sodium hexafluorosilicate
Ammonium hexafluorosilicate
Cadmium metasilicate
Cesium hexafluorosilicate
Cobalt hexafluorosilicate
Copper hexafluorosilicate
Iron hexafluorosilicate
Lithium hexafluorosilicate
Potassium dialuminate
Potassium hexafluorosilicate
Rubidium hexafluorosilicate
Sodium hexafluorosilicate Reaction products of borax ($Na_2B_4O_7$ 10 $H_2O$) with sodium silicate should also be suitable.

Many other inorganic compounds and organic compounds containing metal ions form gels and should be suitable. Such compounds are:
Silicon tetraethoxide
Tetraethylorthosilicate
Aluminum sec-butoxide
Aluminum oxide ($Al_2O_3$) based systems
Borate gels $B(OH)_3$
Aluminum alkoxide
Zirconium alkoxide
Cyanosiloxanes.

Compounds of molybdenum, magnesium and chromium should also be considered, as well as ceramics (clay based materials).

ORGANIC COMPOUNDS

Some organic compounds, including some natural gums, form gels when cooled. The behavior of animal glue is well known in this respect. It is also known that the resin from a wounded tree will gel and harden by oxidation, thus healing the wound. Certain other water soluble gums behave in a similar manner: agar and gum karaya fall in this category. Such natural resins could be employed. They might be present molten or dispersed at high temperature and then solidify when cooled. Rosins and modified rosins, such as rosin esters might be considered. Polyterpene resins and a number of synthetic resins used for compounding adhesives, inks, and coatings could be considered.

Carbohydrates such as various sugars and starches are easily soluble in water but will oxidize and harden if deposited on a hot radiator surface. Such compounds could be used to seal a leak.

Many water soluble gums might be sufficiently easily oxidizable and capable of forming hard carbonaceous compounds when deposited on a hot radiator surface. Such gums are: alginates, alkyl and hyroxyalkylcellulose, carboxymethylcellulose, carrageenan, guar gum, gum agar, gum arabic, gum ghatti, gum karaya, gum tragacanth, hydroxyethylcellulose, hydroxypropyl cellulose, locust bean gum, pectins, polyacrylamide, poly(acrylic acid) and its homologs, polyethylene glycol, poly(ethylene oxide), polyvinyl alcohol, polyvinylpyrrolidone, starch and its modifications, tamarind gum, and xanthan gum.

Synthetic organic water soluble gums should also be suitable. Such materials as polyvinyl pyrrolidone and its copolymers could be useful in developing adhesives for such a sealant.

Within the broad concepts of this invention any organic compound which is water soluble and which will harden and adhere sufficiently on a hot radiator wall could be considered. As disclosed in U.S. Pat. No. 4,765,630 the radiator would contain ethylene glycol (anti-freeze) and the components would be added to the engine while the engine is at a temperature of between 100° F. to 140° F., with the ethylene glycol promoting solidification. As also pointed out in U.S. Pat. No. 4,765,630 in a preferred embodiment therein the potassium silicate comprises 50% of the mixture while the ethylene glycol and water each comprises 25% of the mixture.

A suitable system may consist of two reactive compounds dispersed in water. Such particles will react when deposited on the outer wall of the radiator and brought in contact because of water evaporation. When dispersed in the coolant they cannot react because they are kept separated by the coolant. Based upon this teaching, one could devise a large number of possible systems based on existing two part adhesives. Two part epoxy adhesives could be considered, as well as two part acrylics, polyesters and other reactive polymers.

As is apparent the present invention thus provides a large number of compounds which should be used successfully in the sealant as a replacement for sodium silicate. Although not described it should be understood that other materials may also be used for the minor additives in the sealant in place of, for example, the blue vitroil and the gum of arabic.

I claim:

1. In a sealant for holes and cracks in a hot radiator of an engine cooling system, said sealant being in the form of an aqueous solution containing water and a material which is capable of quickly gelling and which has good adhesion to metals when added to ethylene glycol in the hot radiator, the improvement being in that said sealant is in combination with ethylene glycol, said material being a compound selected from the group consisting of silicates of lithium, ammonium, rubidium, cesium and germanium, and oxides of partly sodium oxide with aluminum oxide or calcium oxide or magnesium oxide, and said material comprising about 50% of the aqueous solution and ethylene glycol combination with said water and said ethylene glycol each comprising about 25% of said combination.

2. The sealant of claim 1 wherein the compound is selected from the group consisting of silicates of lithium and ammonium.

* * * * *